Patented Mar. 15, 1938

2,111,091

UNITED STATES PATENT OFFICE 2,111,091

ANTHRAQUINONE COMPOUNDS

William Dettwyler, Milwaukee, Wis., assignor to E. I. du Pont de Nemours & Company, Wilmington, Del., a corporation of Delaware No Drawing. Application May 25, 1936,
Serial No. 81,686

4 Claims. (Cl. 260—37)

This invention relates to the preparation of new compounds of the anthraquinone series, and more particularly to the preparation of 3-amino-anthraquinone-2,1(N)-benzacridone and its halogenation products. The object of the invention is to provide new intermediates which are useful for the preparation of new and valuable dyestuffs.

I have found that the 3-halogen-anthraquinone-2,1(N)-benzacridones can be treated with p-toluene sulfonamide to give the 3-toluene-sulfonamido-anthraquinone-2,1(N)-benzacridone which in turn can be hydrolyzed to give 3-amino-anthraquinone-2,1(N)-benzacridone. This compound may be halogenated by known methods, the first halogen entering the 4 position of the anthraquinone nucleus. Further halogenation introduces halogen in the Bz ring of the acridone radical.

The following examples are given to more fully illustrate the invention. The parts used are by weight.

Example 1

10 parts of 3-bromo-anthraquinone-2,1(N)-benzacridone, 5.5 parts of p-toluene sulfonamide, 5 parts of soda ash and 0.5 part of cuprous chloride are heated in 200 parts of nitrobenzene at reflux temperature for from 4 to 6 hours. The resulting dark red mass is cooled and the condensation product isolated by filtration. The so obtained sulfonamido-body is then hydrolyzed by dissolving in concentrated sulfuric acid to the free amino-anthraquinone-2,1(N)-benzacridone, which may be isolated by drowning the mass in water, filtering and washing. The 3-amino-anthraquinone-2,1(N)-benzacridone is a dark red powder soluble in most organic solvents with a red color and soluble in concentrated sulfuric acid with a yellow brown color. It dyes cotton in red shades which, however, are not fast to bleach.

The 3-chloro-anthraquinone-2,1(N)-benzacridone may be used in place of the 3-bromo-compound.

Example 2

10 parts of 3-amino-anthraquinone-2,1(N)-benzacridone as obtained in Example 1 are dissolved in 100 parts of concentrated sulfuric acid. Sufficient water is added to bring the acid concentration to about 10% and 10 parts of bromine are then added. The mass is stirred until all the bromine has disappeared and then heated at 80° C. for one hour. It is then filtered and the precipitate is washed. The resulting product is a dibromo-3-amino-anthraquinone-2,1(N)-benzacridone in which one bromo atom is attached in the 4 position of the anthraquinone nucleus, the remaining bromine being present in the Bz-ring of the acridone radical.

Example 3

10 parts of 3-amino-anthraquinone-2,1(N)-benzacridone are dissolved in 60 parts of concentrated sulfuric acid. Sufficient water is added to bring the acid concentration to about 50% and 20 parts of sodium chloride are then added and the solution is cooled to 20° C. Sodium chlorate is then slowly added while the temperature is maintained at 20–25° C., the amount being determined by the degree of chlorination desired. Using theoretical amounts or only a small excess of the sodium chlorate the mono-, di- or trichloro-3-amino-anthraquinone-2,1(N)-benzacridone can be obtained.

The halogenation of the 3-amino-anthraquinone-2,1(N)-benzacridone may be carried out in sulfuric acid as disclosed above, or by other known halogenation methods, such as chlorination in organic solvents, in hydrochloric acid, or in aqueous suspension.

While in the preparation of the 3-amino-anthraquinone-2,1(N)-benzacridone the use of p-toluene sulfonamide is preferred, other readily hydrolyzable sulfonamides may be used, such as benzene sulfonamide, etc.

I claim:

1. The new compounds of the class consisting of 3-amino-anthraquinone-2,1(N)-benzacridone and its halogen substitution products.

2. As a new compound, 3-amino-anthraquinone-2,1(N)-benzacridone.

3. As a new compound, 3-amino-4-halogen-anthraquinone-2,1(N)-benzacridone.

4. As a new compound, 3-amino-4-halogen-anthraquinone-2,1(N)-benzacridone which contains additional halogen in the Bz-ring.

WILLIAM DETTWYLER.